United States Patent Office 3,455,932
Patented July 15, 1969

3,455,932
2-ARYLSULFONYLIMINOQUINOLINE COMPOUNDS
Bernard Loev, Broomall, Pa., assignor to Smith Kline & French Laboratories, Philadelphia, Pa., a corporation of Pennsylvania
No Drawing. Continuation-in-part of application Ser. No. 553,025, May 26, 1966. This application Aug. 23, 1967, Ser. No. 662,574
Int. Cl. C07d 33/52; A61k 27/00
U.S. Cl. 260—288                               6 Claims

ABSTRACT OF THE DISCLOSURE 2-arylsulfonyliminoquinolines which are prepared by reacting a quinolinium salt or a di-lower alkylacetal of a carbostyril with a sulfonamide have analgesic activity.

---

This application is a continuation-in-part of Ser. No. 553,025, filed May 26, 1966, now abandoned.

This invention relates to new 2-arylsulfonylinminoquinoline compounds having pharmacodynamic activity, in particular, having analgesic activity as demonstrated, for example, in the D'Armour-Smith test in which analgesic activity is exhibited in rats at doses of 50 mg./kg. orally. Also this invention relates to intermediates for preparing certain of these compounds.

The compounds of this invention having pharmacodynamic activity are represented by the following formula:

Formula I

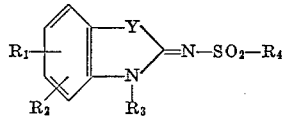

when:

Y is—CH=CH, —$CH_2$—$CH_2$—or

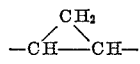

$R_1$ is hydrogen, halogen, trifluoromethyl, lower alkyl, lower alkoxy, hydroxy, nitro, amino, mono-lower alkylamino, di-lower alkylamino, lower alkanolyamino, lower alkoxycarbonyl, carboxy, carbamoyl or sulfamoyl;
$R_2$ is hydrogen, halogen, hydroxy, lower alkoxy or, when taken together with $R_1$ and when adjacent to $R_1$, methylenedioxy;
$R_3$ is hydrogen, lower alkyl or lower alkoxy; and
$R_4$ is phenyl, halophenyl, lower alkyphenyl, lower alkoxyphenyl, trifluoromethylphenyl, aminophenyl or lower alkanoylaminophenyl.

Advantageous compounds of this invention are represented by Formula I when:

Y is —CH=CH—, —$CH_2$—$CH_2$— or

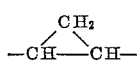

$R_1$ is hydrogen, chloro or trifluoromethyl;
$R_2$ is hydrogen;
$R_3$ is methyl; and
$R_4$ is phenyl, chlorophenyl or tolyl.

Also included in this invention are benzyl compounds represented by the following formula:

Formula II

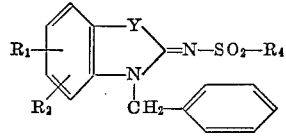

when:

Y, $R_2$ and $R_4$ are as defined in Formula I; and
$R_1$ is hydrogen, halogen, trifluoromethyl, lower alkyl, lower alkoxy, hydroxy, nitro, amino, mono-lower alkylamino, di-lower alkylamino, lower alkanoylamino, lower alkoxycarbonyl, benzyloxycarbonyl, carbamoyl or sulfamoyl.

The benzyl compounds of Formula II are useful as intermediates in the preparation of compounds of Formula I in which $R_3$ is hydrogen as is described below.

The terms "lower alkyl," "lower alkoxy" and "lower alkanoyl" where used herein denote groups having 1–4, preferably 1–2, carbon atoms and "halogen" denotes chloro, bromo or fluoro.

The analgesic compounds of this invention have the basic structural features of the carbostyril compounds of British Patent 1,002,665 and the cyclopropa[c] quinolines of United States Patent 3,141,888, differing in that the compounds of the present invention have an arylsulfonylimino group in place of a keto or thio moiety in the 2-position of the quinoline ring. The $R_1$, $R_2$ and $R_3$ substituents on the quinoline ring of the compounds of Formula I above, are all known as substituents on the quinoline nucleus of compounds having pharmacodynamic activity as shown by the above cited British and United States patents. From the disclosure in these said patents that the carbostyrils and cyclopropa[c] quinolines thereof have pharmacodynamic activity, the use as analgesic agents of the compounds of Formula I of the present invention is apparent to one skilled in the art.

Compounds of this invention are prepared by the following procedure:

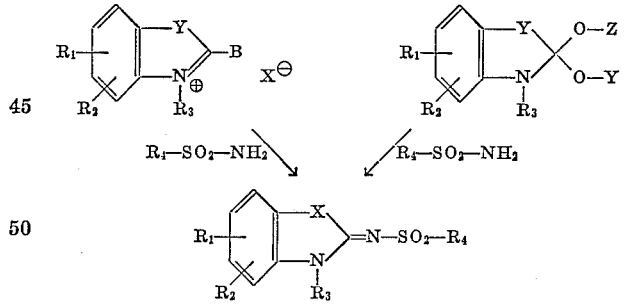

The terms Y, $R_2$ and $R_4$ are as defined above;
$R_1$ is hydrogen, halogen, trifluoromethyl, lower alkyl, lower alkoxy, hydroxy, nitro, di-lower alkylamino, lower alkanoylamino, lower alkoxycarbonyl, benzyloxycarbonyl, carbamoyl or sulfamoyl;
$R_3$ is lower alkyl, lower alkoxy or benzyl;
Z is lower alkyl;
B is lower alkoxy, preferably methoxy or ethoxy or chloro; and
X is an anion such as methosulfate or fluoroborate.

According to the above procedure, a quinolinium salt or a di-lower alkylacetal of a carbostyril is reacted with a sulfonamide of the formula $R_4SO_2NH_2$ in which $R_4$ is as defined above. The reaction is carried out in an inert solvent such as methylene chloride or chloroform at about room temperature for about 1–6 hours. Preferably an excess, for example, about a two-fold excess, of sulfonamide is used.

The 2-lower alkoxyquinolinium salts are prepared by reacting a carbostyril with an alkylating agent such as a lower alkylsulfate or a tri-lower alkyloxonium fluoborate. The lower alkylsulfate salts are prepared by reacting equimolar amounts of the carbostyril and the lower alkylsulfate at elevated temperature, for example at about 70–100° C., for about 1–3 hours. The fluoborate salts are prepared by reacting equimolar amounts of the carbostyril and the tri-lower alkyloxonium fluoborate at about room temperature in an inert solvent such as methylene chloride.

Alternatively, the 2-lower alkoxyquinolinium salts are prepared by reacting a 2-lower alkoxyquinoline with a lower alkylsulfate or -halide, preferably in an inert solvent such as chloroform, benzene or a lower alkanol.

The 2-chloroquinolinium salts are prepared by reacting an N-unsubstituted carbostyril with a chlorinating agent such as phosphorus pentachloride, phosphorus oxychloride, tosyl chloride in pyridine or carbonyl chloride, then forming the N-lower alkylquinolinium salt with an alkylating agent such as a lower alkylsulfate or a tri-lower alkyloxonium fluoborate as described above for the preparation of the 2-lower alkoxyquinolinium salts.

The di-lower alkylacetals of carbostyrils are prepared by treating the quinolinium salts with a sodium lower alkoxide. The reaction is carried out in a solvent such as a lower alkanol at about room temperature for about 15 minutes to four hours. The solvent is removed in vacuo and the residue is distilled. Alternatively, the residue, without distillation, may be used in the reaction with a sulfonamide described above.

The carbostyrils are either known to the art or are prepared by known methods, for example as described in U.S. 3,141,888.

The compounds of Formulas I and II in which $R_1$ is amino are prepared by reducing the corresponding nitro compounds by catalytic hydrogenation at room temperature or chemically, for example, with stannous chloride in hydrochloric acid. The compounds in which $R_1$ is mono-lower alkylamino are prepared by mono-alkylating the amino substituted compound by reacting with about an equimolar amount of an alkylating agent.

The compounds of Formula I in which $R_1$ is carboxy are prepared by catalytic hydrogenation of the corresponding benzyloxycarbonyl compounds at room temperature using, for example, palladium-on-carbon in ethyl acetate.

The compounds of Formula I in which $R_3$ is hydrogen are prepared by hydrogenation of the benzyl intermediates of Formula II. The hydrogenation is carried out at room temperature in the presence of a catalyst such as, for example, palladium-on-carbon in ethyl acetate. The nitro substituted compounds of Formula I in which $R_3$ is hydrogen are prepared by oxidizing the corresponding amino compounds using peroxy-fluoroacetic acid.

The analgesic compounds of this invention may be administered internally in conventional dosage forms by incorporating an appropriate dose of the compound with pharmaceutical carriers according to accepted pharmaceutical practices.

The following examples are not limiting but are illustrative of the compounds of this invention and procedures for their preparation.

EXAMPLE 1

A mixture of 15.9 g. of 1-methylcarbostyril and 12.6 g. of methylsulfate is heated in an oil bath at 80° C. for two hours, then cooled and washed with ether to give 2-methoxy-1-methylquinolinium methosulfate.

To 1.35 g. of sodium methoxide in ethanol is added 7.15 g. of 2-methoxy-1-methylquinolinium methosulfate. The resulting mixture is stirred for one hour, then concentrated in vacuo. Methylene chloride (50 ml.) is added. After adding 8.6 g. of p-toluenesulfonamide, the mixture is stirred for four hours, then filtered. The filtrate is concentrated in vacuo and chloroform is added to the solid residue. Filtering, then concentrating the filtrate in vacuo and recrystallizing the residue from ethanol gives 1-methyl-2-(p-tolylsulfonylimino)quinoline.

EXAMPLE 2

Using the following carbostyrils in place of 1-methylcarbostyril in the procedure of Example 1:

6,7-dimethoxy-1-methylcarbostyril,
1-methyl-6,7-methylenedioxycarbostyril,
6-bromo-1-methylcarbostyril,
1-methyl-6-nitrocarbostyril,
6-acetamido-1-methylcarbostyril,
6-methoxy-1-methylcarbostyril,
6-dimethylamino-1-methylcarbostyril,
1-methyl-6-sulfamoylcarbostyril, the following products are obtained, respectively:

6,7-dimethoxy-1-methyl-2-(p-tolylsulfonylimino) quinoline,
1-methyl-6,7-methylenedioxy-2-(p-tolylsulfonylimino) quinoline,
6-bromo-1-methyl-2-(p-tolylsulfonylimino)quinoline,
1-methyl-6-nitro-2-(p-tolylsulfonylimino)quinoline,
6-acetamido-1-methyl-2-(p-tolylsulfonylimino)quinoline,
6-methoxy-1-methyl-2-(p-tolylsulfonylimino)quinoline,
6-dimethylamino-1-methyl-2-(p-tolylsulfonylimino) quinoline,
1-methyl-6-sulfamoyl-2-(p-tolylsulfonylimino)quinoline.

Similarly, using 6-hydroxy-1-methylcarbostyril (prepared by refluxing the corresponding 6-methoxy compound with hydrobromic acid in acetic acid for four hours, then concentrating in vacuo and recrystallizing from ethanol-hexane) in the procedure of Example 1 gives 6-hydroxy-1-methyl-2-(p-tolylsulfonylimino)quinoline.

EXAMPLE 3

Hydrogenating 1 - methyl - 6 - nitro - 2 - (p - tolylsulfonylimino)quinoline at room temperature in ethyl acetate containing Raney nickel until one equivalent of hydrogen is taken up, then filtering and removing the solvent in vacuo gives 6-amino-1-methyl-2-(p-tolylsulfonylimino)quinoline.

Heating the above prepared 6-amino compound with an equimolar amount of methyl iodide in methanol at 50° C. for two hours, then removing the solvent in vacuo, stirring the residue with dilute sodium carbonate and filtering gives 1 - methyl - 6-methylamino-2-(p-tolylsulfonylimino)quinoline.

Similarly, heating the above prepared 6-amino compound with an equimolar amount of ethyl bromide and butyl bromide in ethanol gives 6-ethylamino-1-methyl-2-(p - tolylsulfonylimino)quinoline and 6 - butylamino-1-methyl - 2 - (p - tolylsulfonylimino)quinoline, respectively.

EXAMPLE 4

Triethyloxonium fluoborate (55 g.) is added to 46 g. of 1-methylcarbostyril in 60 ml. of methylene chloride at room temperature. The solid material is isolated by filtration to give 2-ethoxy-1-methylquinolinium fluoborate.

To a solution of 23 g. of sodium ethoxide in 250 ml. of ethanol is added 62 g. of 2-ethoxy-1-methylquinolinium fluoborate portionwise over one hour. After one hour, the mixture is filtered, concentrated and filtered in vacuo. Hexane is added to the solid material and the solution is filtered, concentrated and distilled to give the diethyl acetal of 1-methylcarbostyril.

To 23 g. of the above prepared acetal in 250 ml. of chloroform is added 32 g. of benzenesulfonamide. The resulting mixture is stirred for four hours, then filtered and concentrated in vacuo to give 1-methyl-2-phenylsulfonyliminoquinoline.

EXAMPLE 5

By the procedure of Example 4, the following carbostyrils are converted to the quinolinium fluoborate salts:

1-methyl-6-trifluoromethylcarbostyril,
3,4-dihydro-1-methyl-6-trifluoromethylcarbostyril.

Each of the above prepared salts is added to sodium ethoxide in ethanol and the resulting mixture is concentrated in vacuo, treated with methylene chloride, then with p-toluenesulfonamide. The mixture is stirred for four hours, then filtered and concentrated in vacuo. Adding chloroform, filtering and concentrating in vacuo gives the following products, respectively:

1-methyl-2-(p-tolysulfonylimino)-6-trifluoromethylquinoline,
3,4-dihydro-1-methyl-2-(p-tolysulfonylimino)-6-trifluoromethylquinoline.

EXAMPLE 6

The following compounds are converted to the quinolinium fluoborate salts by the procedure of Example 4:

1a,7b-dihydro-3-methyl-6-trifluoromethyl-1H-cyclopropa[c]quinoline-2-one,
1a,7b-dihydro-5,6-dihydroxy-3-methyl-1H-cyclopropa[c]quinoline-2-one,
3-benzyl-6-chloro-1a,7b-dihydro-1H-cyclopropa[c]quinoline-2-one.

Using the above prepared salts in the procedure of Example 5 gives the following compounds, respectively:

1a,7b-dihydro-3-methyl-2-(p-tolylsulfonylimino)-6-trifluoromethyl-1H-cyclopropa[c]quinoline,
1a,7b-dihydro-5,6-dihydroxy-3-methyl-2-(p-tolylsulfonylimino)-1H-cyclopropa[c]quinoline,
3-benzyl-6-chloro-1a,7b-dihydro-2-(p-tolylsulfonylimino)-1H-cyclopropa[c]quinoline.

Hydrogenating the above prepared 3-benzyl-6-chloro-1a,7b - dihydro - 2 - (p-tolylsulfonylimino)-1H-cyclopropa[c]quinoline in ethanol at room temperature using palladium-on-carbon as catalyst, then filtering, concentrating in vacuo and recrystallizing from isopropyl ether gives 6 - chloro - 1a,7b-dihydro-2-(p-tolylsulfonylimino)-1H-cyclopropa[c]quinoline.

EXAMPLE 7

1a,7b - dihydro - 3 - methoxy-1H-cyclopropa[c]quinoline-2-one is converted to the quinolinium fluoborate salt by the procedure of Example 4.

Using the above prepared salt and benzenesulfonamide in the procedure of Example 5, the product is 1a,7b-dihydro - 3 - methoxy - 2 - phenylsulfonylimino-1H-cyclopropa[c]quinoline.

EXAMPLE 8

Using 3,4-dihydro-1-methylcarbostyril (prepared by hydrogenating 1-methylcarbostyril in ethanol in the presence of Raney nickel) and m-toluenesulfonamide in the procedure of Example 1, the product is 3,4-dihydro-1-methyl-2-(m-tolylsulfonylimino)quinoline.

Similarly, using 1-ethyl-3,4-dihydrocarbostyril and p-toluenesulfonamide in the procedure of Example 1, the product is 1 - ethyl - 3,4 - dihydro-2-(p-tolylsulfonylimino)quinoline.

EXAMPLE 9

By the procedure of Example 1, using 1-methylcarbostyril and the following sulfonamides:

p-chlorobenzenesulfonamide,
p-bromobenzenesulfonamide,
p-fluorobenzenesulfonamide,
p-butoxybenzenesulfonamide,
p-butylbenzenesulfonamide,
$\alpha,\alpha,\alpha$-trifluoro-p-toluenesulfonamide,
o-toluenesulfonamide,
sulfanilamide,
4-sulfamoylacetanilide, the products are respectively:

2-(p-chlorophenylsulfonylimino)-1-methylquinoline,
2-(p-bromophenylsulfonylimino)-1-methylquinoline,
2-(p-fluorophenylsulfonylimino)-1-methylquinoline,
2-(p-methoxyphenylsulfonylimino)-1-methylquinoline,
2-(p-butoxyphenylsulfonylimino)-1-methylquinoline,
2-(p-butylphenylsulfonylimino)-1-methylquinoline,
1-methyl-2-($\alpha,\alpha,\alpha$-trifluoro-p-tolylsulfonylimino)quinoline,
1-methyl-2-(o-tolylsulfonylimino)quinoline,
2-(p-aminophenylsulfonylimino)-1-methylquinoline,
2-(p-acetamidophenylsulfonylimino)-1-methylquinoline.

EXAMPLE 10

By the procedure of Example 1, using in place of 1-methylcarbostyril the following:

6-carbamoyl-1-methylcarbostyril,
6-methoxycarbonyl-1-methylcarbostyril,
1,7-dimethylcarbostyril,
5,7-dichloro-1-methylcarbostyril, the products are, respectively:

6-carbamoyl-1-methyl-2-(p-tolylsulfonylimino)quinoline,
6-methoxycarbonyl-1-methyl-2-(p-tolylsulfonylimino)quinoline,
1,7-dimethyl-2-(p-tolylsulfonylimino)quinoline,
5,7-dichloro-1-methyl-2-(p-tolylsulfonylimino)quinoline.

EXAMPLE 11

A mixture of 16 g. of 2-chloroquinoline and 13 g. of benzyl chloride in chloroform is heated at reflux for one hour, then concentrated in vacuo. The residue is treated with ether and filtered to give 1-benzyl-2-chloroquinolinium chloride.

To 2.7 g. of sodium methoxide in anhydrous methanol is added 14.4 g. of 1-benzyl-2-chloroquinolinium chloride. The resulting mixture is stirred for four hours, then concentrated in vacuo. To the residue is added 150 ml. of methylene chloride, then 15.7 g. of benzenesulfonamide. The mixture is stirred for four hours, then worked up as in Example 5 to give 1-benzyl-2-phenylsulfonyliminoquinoline.

Hydrogenating the above prepared 1-benzyl compound by the procedure of Example 6 gives 2-phenylsulfonyliminoquinoline.

Similarly, using 17.1 g. of p-toluenesulfonamide in place of benzenesulfonamide in the above procedure, 1-benzyl - 2-(p-tolylsulfonylimino)quinoline is obtained which, on hydrogenation by the procedure of Example 6, gives 2-(p-tolylsulfonylimino)quinoline.

EXAMPLE 12

A mixture of equimolar amounts of 2-methoxyquinoline and methylsulfate in chloroform is heated at reflux for one hour. Ether is added and the mixture is filtered to give 2-methoxy-1-methylquinolinium methosulfate.

To a chloroform solution of the above prepared methosulfate salt is added, at room temperature, one molar equivalent of o-ethylbenzenesulfonamide. The resulting mixture is stirred for three hours at room temperature, then washed with dilute sodium hydroxide, dried and concentrated in vacuo to give 2-(o-ethylphenylsulfonylimino)-1-methyl quinoline.

EXAMPLE 13

Refluxing an ethanol solution of 6-methoxycarbonyl-1-methylcarbostyril with an excess of 10% sodium hydroxide solution, then cooling the mixture, acidifying and filtering gives 6-carboxy-1-methylcarbostyril.

Ten grams of 6-carboxy-1-methylcarbostyril, 2.7 g. of sodium methoxide and 8.4 g. of benzyl bromide in ethanol are heated at reflux for four hours. The mixture is then filtered and the filtrate is evaporated to dryness to give 6-benzyloxycarbonyl-1-methylcarbostyril.

Using 6-benzyloxycarbonyl-1-methylcarbostyril in the procedure of Example 1 gives 6-benzyloxycarbonyl-1-methyl-2-(p-tolylsulfonylimino)quinoline.

Two grams of the above prepared 6-benzyloxycarbonyl-1-methyl - 2-(p-tolylsulfonylamino)quinoline in ethyl acetate is hydrogenated using palladium-on-carbon as catalyst. Filtering and removing the solvent in vacuo gives 6-carboxy-1-methyl-2-(p-tolylsulfonylimino)quinoline.

EXAMPLE 14

By the procedure of Example 1, 16.1 g. of 3,4-dihydro-1-methylcarbostyril (prepared by hydrogenating 1-methylcarbostyril in ethanol using Raney nickel as catalyst) is converted to 3,4-dihydro-2-methoxy - 1-methylquinolinium methosulfate.

Using 7.2 g. of 3,4-dihydro-2-methoxy-1-methylquinolinium methosulfate in the procedure of Example 1, the product is 3,4-dihydro-1-methyl-2-(p-tolylsulfonylimino)quinoline.

EXAMPLE 15

A mixture of 21.5 g. of 3,4-dihydro-6-trifluoromethyl-carbostyril and 12.6 g. of benzyl chloride in chloroform is heated at reflux for one hour to give, after concentrating in vacuo, adding ether and filtering, 1-benzyl-3,4-dihydro-6-trifluoromethylcarbostyril.

Using the above prepared 1-benzyl carbostyril in the procedure of Example 1, the product is 1-benzyl-3,4-dihydro - 2 - (p-tolylsulfonylimino) - 6 - trifluoromethylquinoline.

Hydrogenating the above prepared 1-benzyl - 3,4-dihydro-2-(p-tolylsulfonylimino) - 6-trifluoromethylquinoline by the procedure of Example 6 gives 3,4-dihydro-2-(p-tolylsulfoynlimino)-6-trifluoromethylquinoline.

What is claimed is:

1. A compound of the formula:

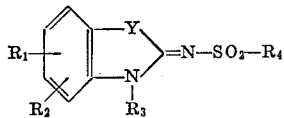

in which:

Y is —CH=CH—, —CH$_2$—CH$_2$— or

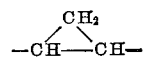

$R_1$ is hydrogen, halogen, trifluoromethyl, lower alkyl, lower alkoxy, hydroxy, lower alkoxycarbonyl, carboxy, carbamoyl or sulfamoyl;

$R_2$ is hydrogen, halogen, hydroxy, lower alkoxy or, when taken together with $R_1$ and when adjacent to $R_1$, methylenedioxy;

$R_3$ is hydrogen, lower alkyl or lower alkoxy; and $R_4$ is phenyl, halophenyl, lower alkylphenyl, lower alkoxyphenyl, trifluoromethylphenyl, aminophenyl or lower alkanoylaminophenyl.

2. A compound according to claim 1 in which Y is —CH=CH—, $R_1$ and $R_2$ are hydrogen, $R_3$ is methyl and $R_4$ is p-tolyl, said compound being 1-methyl-2-(p-tolylsulfonylimino)quinoline.

3. A compound according to claim 1 in which Y is —CH=CH—, $R_1$ and $R_2$ are hydrogen, $R_3$ is methyl and $R_4$ is p-chlorophenyl, said compound being 2-(p-chlorophenylsulfonylimino)-1-methylquinoline.

4. A compound accorcding to claim 1 in which Y is —CH=CH—, $R_1$ and $R_2$ are hydrogen, $R_3$ is methyl and $R_4$ is p-aminophenyl, said compound being 2-(p-aminophenylsulfonylimino)-1-methylquinoline.

5. A compound according to claim 1 in which Y is —CH=CH—, $R_1$ and $R_2$ are hydrogen, $R_3$ is methyl and $R_4$ is p-acetamidophenyl, said compound being 2-(p-acetamidophenylsulfonylimino)-1-methylquinoline.

6. A compound according to claim 1 in which Y is

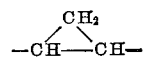

$R_1$ is 6-trifluoromethyl, $R_2$ is hydrogen, $R_3$ is methyl and $R_4$ is p-tolyl, said compound being 1α,7β-dihydro-3-methyl - 2-(p-tolylsulfonylimino) - 6-trifluoromethyl-1H-cyclopropa[c]quinoline.

References Cited

UNITED STATES PATENTS

| 3,005,823 | 10/1961 | Kaeding | 260—289 X |
| 3,141,888 | 7/1964 | Loev | 260—289 |
| 3,300,502 | 1/1967 | Seeger | 260—289 |

ALEX MAZEL, Primary Examiner

D. G. DAUS, Assistant Examiner

U.S. Cl. X.R.

260—286, 287, 289, 556, 687, 689, 690, 694; 424—258